United States Patent
Park et al.

(10) Patent No.: US 9,245,521 B2
(45) Date of Patent: Jan. 26, 2016

(54) METHOD FOR CORRECTING VOICE RECOGNITION ERROR AND BROADCAST RECEIVING APPARATUS APPLYING THE SAME

(71) Applicant: SAMSUNG ELECTRONICS CO., LTD., Suwon-si (KR)

(72) Inventors: Sung-woo Park, Seoul (KR); Jae-cheol Kim, Suwon-si (KR); Jae-wook Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 267 days.

(21) Appl. No.: 13/923,813

(22) Filed: Jun. 21, 2013

(65) Prior Publication Data

US 2014/0019127 A1 Jan. 16, 2014

(30) Foreign Application Priority Data

Jul. 12, 2012 (KR) .......................... 10-2012-0076129

(51) Int. Cl.
*G10L 15/22* (2006.01)
*G10L 15/01* (2013.01)

(52) U.S. Cl.
CPC ................. *G10L 15/01* (2013.01); *G10L 15/22* (2013.01); *G10L 2015/221* (2013.01)

(58) Field of Classification Search
USPC .......................................... 704/235, 275, 270
See application file for complete search history.

(56) References Cited

U.S. PATENT DOCUMENTS

| | | | |
|---|---|---|---|
| 8,355,914 B2 * | 1/2013 | Joh et al. ..................... 704/235 |
| 2007/0100635 A1 | 5/2007 | Mahajan et al. |
| 2009/0125299 A1 | 5/2009 | Wang |
| 2009/0271193 A1 | 10/2009 | Miyamoto et al. |
| 2009/0306980 A1 * | 12/2009 | Shin ............................. 704/235 |
| 2010/0218141 A1 | 8/2010 | Xu et al. |
| 2012/0158405 A1 | 6/2012 | Gschwendtner |

OTHER PUBLICATIONS

Communication dated Sep. 16, 2013, issued by the European Patent Office in counterpart European Application No. 13176288.2.
Written Opinion dated Nov. 25, 2013, issued by the International Searching Authority in counterpart International Application No. PCT/KR2013/006245.
International Search Report dated Nov. 25, 2013, issued by the International Searching Authority in counterpart International Application No. PCT/KR2013/006245.

* cited by examiner

*Primary Examiner* — Abul Azad
(74) *Attorney, Agent, or Firm* — Sughrue Mion, PLLC (57) ABSTRACT

A method for correcting a voice recognition error and a broadcast receiving apparatus applying the same are provided. The method for correcting the voice recognition error includes, receiving a user's spoken command, recognizing the user's spoken command and determining text corresponding to the user's spoken command, if a user command to correct the determined text is input, displaying a text correction user interface in which a morpheme of the determined text and an indicator are associated with each other, and correcting the morpheme of the determined text by selecting the associated indicator of the text correction UI. Accordingly, the broadcast receiving apparatus exactly corrects the misrecognized word with a word desired by the user.

17 Claims, 7 Drawing Sheets

METHOD FOR CORRECTING VOICE RECOGNITION ERROR AND BROADCAST RECEIVING APPARATUS APPLYING THE SAME

CROSS-REFERENCE TO RELATED APPLICATION

This application claims priority from Korean Patent Application No. 10-2012-0076129, filed on Jul. 12, 2012, in the Korean Intellectual Property Office, the disclosure of which is incorporated herein by reference in its entirety.

BACKGROUND

1. Field

Methods and apparatuses consistent with exemplary embodiments relate to a method for correcting a voice recognition error and a broadcast receiving apparatus applying the same, and more particularly, to a method for correcting a voice recognition error, which corrects a voice that is misrecognized in an interactive voice recognition system, and a broadcast receiving apparatus applying the same.

2. Description of the Related Art

As broadcast receiving apparatuses have become multi-functional and have advanced in recent years, various input methods used to control the broadcast receiving apparatuses have been developed. For example, an input method using a mouse, an input method using a touch pad, and an input method using a motion sensing remote controller have been developed.

In particular, from among various input methods, a voice recognition method, which recognizes a user's voice and spoken commands and controls a display apparatus so that a user can control a broadcast receiving apparatus more easily, is becoming more popular.

However, the method that recognizes a voice or spoken command uttered by the user and controls the broadcast receiving apparatus may not obtain a satisfactory result due to differences in dental structures and pronunciations of different users.

That is, if the broadcast receiving apparatus misrecognizes a voice or spoken command uttered by the user, it is impossible to control the broadcast receiving apparatus as desired by the user or it is impossible to search for a desired content. Also, if the broadcast receiving apparatus misrecognizes a specific word uttered by the user, there is a high possibility that the broadcast receiving apparatus will consistently misrecognize the specific word when the user utters the specific word again.

Therefore, there is a demand for a method for efficiently correcting a voice recognition error by correcting a voice recognition result that is misrecognized by a broadcast receiving apparatus.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a method for correcting a voice recognition error, which can correct a voice recognition result that is misrecognized by a broadcast receiving apparatus, as desired by a user, and a broadcast receiving apparatus applying the same.

According to an aspect of an exemplary embodiment, there is provided a method for correcting a voice recognition error of a broadcast receiving apparatus, the method including: receiving a user's spoken command, recognizing the user's spoken command and determining text corresponding to the user's spoken command, if a second user command to correct the determined text is input, displaying a text correction user interface (UI) in which a morpheme of the determined text and an indicator are associated with each other, and correcting the morpheme of the determined text by selecting the associated indicator of the text correction UI.

The correcting may include: if the morpheme is selected using the associated indicator, displaying a candidate morpheme corresponding to the morpheme, and if the candidate morpheme is selected, correcting the morpheme by replacing the morpheme with the selected candidate morpheme.

The displaying the candidate morpheme may include displaying a second indicator corresponding to the candidate morpheme on one side of the candidate morpheme.

The correcting the target morpheme may include, if the second indicator corresponding to the candidate morpheme is selected, correcting the morpheme to be replaced by replacing the morpheme with the candidate morpheme corresponding to the selected indicator.

The indicator may be one of a number and a character.

The determining may include: if the user's spoken command is input, converting the user's spoken command from an analogue signal into a digital signal, transmitting the converted digital signal to an external server, and receiving text information corresponding to the digital signal from the server.

The method may also include transmitting a result of the correcting to the server to update a language model and a sound model stored in the server.

According to an aspect of another exemplary embodiment, there is provided a broadcast receiving apparatus including: a voice input which receives a user's spoken command, a display, and a controller which, if a user's spoken command is input through the voice input, recognizes the user's spoken command and determines text corresponding to the user's spoken command, if a second user command to correct the determined text is input, displays a text correction user interface (UI) in which a morpheme of the determined text and an indicator are associated with each other, and controls a display to correct the morpheme of the determined text by selecting the associated indicator of the text correction UI.

If the morpheme is selected using the associated indicator, the controller may display a candidate morpheme corresponding to the morpheme, and, if the candidate morpheme is selected, the controller may control the display to correct the morpheme by replacing the target morpheme with the selected candidate morpheme.

The controller may control the display to display a second indicator corresponding to the candidate morpheme on one side of the candidate morpheme.

If the second indicator corresponding to the candidate morpheme is selected, the controller may control the display to correct the morpheme to be replaced by replacing the morpheme the candidate morpheme corresponding to the selected indicator.

The indicator may be one of a number and a character.

The broadcast receiving apparatus may further include a communicator which communicates with an external server, and, if a user's spoken command is input through the voice input, the controller may convert the user's spoken command from an analogue signal into a digital signal, may transmit the converted digital signal to the external server through the communicator, may receive text information corresponding to the digital signal from the server, and may determine the text information.

The controller may control the communicator to transmit a result of the correcting to the server to update a language model and a sound model stored in the server.

According to an aspect of another exemplary embodiment, there is provided a method for correcting a voice recognition error of a broadcast receiving apparatus, the method includes: recognizing a user's spoken command; determining text corresponding to the user's spoken command; displaying an indicator which corresponds to a morpheme of the determined text; and correcting the morpheme of the determined text in response to receiving a user correction command corresponding to the indicator.

The correcting the morpheme may include displaying a candidate morpheme corresponding to the morpheme of the determined text in response to receiving the user correction command corresponding to the indicator and selecting the candidate morpheme and correcting the morpheme of the determined text by replacing the morpheme of the determined text with the selected candidate morpheme.

The method may also include transmitting a result of the correcting to a server to update a language model and a sound model stored in the server.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 1:
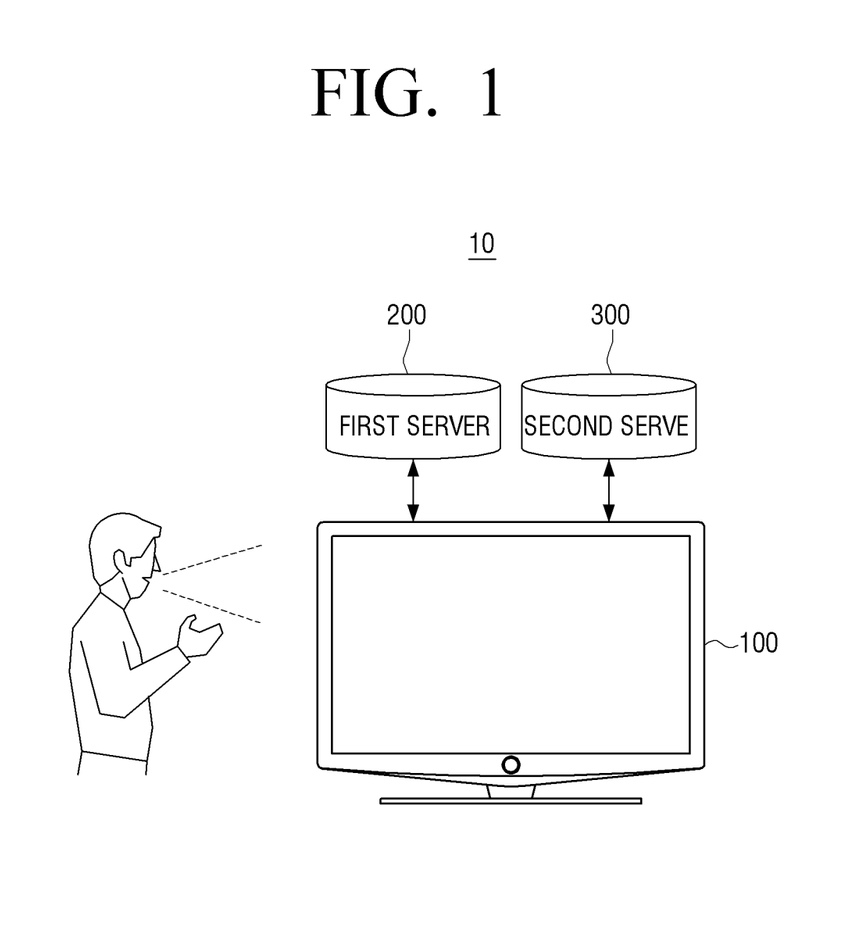
FIG. 1 is a view illustrating an interactive voice recognition system according to an exemplary embodiment.

FIG. 1 is a view illustrating an interactive voice recognition system 10 according to an exemplary embodiment. As shown in FIG. 1, an interactive voice recognition system 10 includes a broadcast receiving apparatus 100 and a first server 200 and a second server 300 to recognize a user's spoken command (i.e., a user voice command). The broadcast receiving apparatus 100 may be an apparatus such as a smart TV, but this is merely an example. The broadcast receiving apparatus 100 may be realized by various electronic apparatuses such as a mobile phone including a smart phone, a desktop PC, a set-top box, a notebook computer, and a navigation system.

If a user's spoken command is input through a voice input apparatus, the broadcast receiving apparatus 100 converts the input user's spoken command into a digital signal, removes a noise from the digital signal, and transmits the digital signal to the first server 200. If the digital signal is received from the broadcast receiving apparatus 100, the first server 200 converts the digital signal corresponding to the user's spoken command into text information using a language model, a sound model, and a pronunciation dictionary, and transmits the text information to the broadcast receiving apparatus 100.

The broadcast receiving apparatus 100 transmits the text information received from the first server 200 to the second server 300. If the text information is received from the broadcast receiving apparatus 100, the second server 300 generates response information corresponding to the received text information and transmits the response information to the broadcast receiving apparatus 100. The response information may include at least one of a response message corresponding to the user's spoken command, a control signal, and a result of searching content. The response message is text information which responds to the user's spoken command as if having a conversation with the user. For example, if the user's spoken command is "Please search ooo", the response message may be text information which responds to the user's spoken command, such as "I will search it". The control signal is a signal to control the broadcast receiving apparatus 100 in response to the user's spoken command. For instance, if the user's spoken command is "Please change the channel to ooo (channel name)", the control signal is a signal to control a tuner of the broadcast receiving apparatus 100 to tune to a channel corresponding to the user's spoken command. The result of searching content is information responding to a content search request of the user. For example, if the user's spoken command is "Who starred in the movie ooo (movie name)?", the result of searching content is information of a result of searching the star of the movie corresponding to the user's spoken command.

The broadcast receiving apparatus 100 may perform various functions corresponding to the user's spoken commands based on the response information. For example, if a user's spoken command to change the channel is input, the broadcast receiving apparatus 100 tunes to a corresponding channel and displays the channel. In this case, the broadcast receiving apparatus 100 may provide a response message corresponding to the function requested by the user. In the above example, the broadcast receiving apparatus 100 outputs information on the changed channel or a message indicating that the channel has been changed in a form of a sound or a text.

In particular, the broadcast receiving apparatus 100 may output the response message corresponding to the user's spoken command in the form of the sound or text, and may output content data regarding searched content. For example, if a user's spoken command to request content information such as "Please let me know the newest movie" is input, the broadcast receiving apparatus 100 may output a response message such as "I will let you know the newest movie" as a sound, and may display content data regarding the searched newest movie.

In particular, the broadcast receiving apparatus 100 may correct a text corresponding to the user's spoken command recognized through the first server 200 and the second server 300 using a text correction user interface (UI).

Specifically, if a user's spoken command is input, the broadcast receiving apparatus 100 determines text information using the first server 200 as described above. At this time, if a part of the determined text is a text that the user does not want, and a user command to correct the text (for example, a voice command or a specific button on a remote controller) is input, the broadcast receiving apparatus 100 displays the text correction UI. At this time, the text correction UI divides text information uttered by the user into morphemes, assigns an indicator to each morpheme, and displays the morphemes and the indicators matched with each other. The indicator is to discriminate the morphemes of the text information and may be a number or a character. However, this is merely an example and the indicator may be a word or a symbol designated by the user.

If one of the indicators is selected from the text correction UI according to a user command, the broadcast receiving apparatus 100 designates the morpheme corresponding to the selected indicator as a target morpheme to be replaced. If a user's spoken command including a correct morpheme to be changed is re-input, the broadcast receiving apparatus 100 recognizes the re-input user's spoken command and corrects the target morpheme by replacing it with the re-input morpheme.

Also, the broadcast receiving apparatus 100 may display a candidate morpheme of the target morpheme to be replaced on one side of the target morpheme using the language model and the sound model. At this time, the candidate morpheme of the target morpheme may be assigned an indicator. If a user's spoken command including an indicator corresponding to a correct morpheme to be changed is re-input, the broadcast receiving apparatus 100 may correct the target morpheme by replacing it with a candidate morpheme corresponding to the indicator re-input by the user from among the candidate morphemes.

The broadcast receiving apparatus 100 displays the corrected text and performs a function according to the corrected text. The broadcast receiving apparatus may transmit information of a result of the correcting to the first server 200 to update the sound model and the language model according to the result of the correcting.

As described above, the interactive voice recognition system 10 corrects the misrecognized text by selecting the indicator of the text correction UI, so that the user can exactly correct the word misrecognized by the broadcast receiving apparatus 100 with a desired word.

Figure 2:
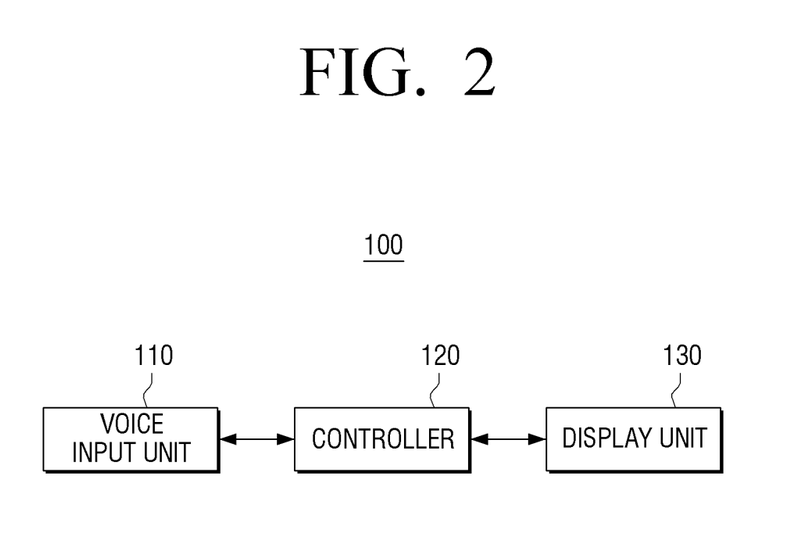
FIG. 2 is a block diagram schematically illustrating a broadcast receiving apparatus according to an exemplary embodiment.

Hereinafter, the broadcast receiving apparatus 100 according to an exemplary embodiment will be explained in detail with reference to FIGS. 2 to 6. FIG. 2 is a block diagram schematically illustrating the broadcast receiving apparatus 100 according to an exemplary embodiment. As shown in FIG. 2, the broadcast receiving apparatus 100 includes a voice input unit 110 (e.g., a voice input, etc.), a controller 120, and a display unit 130 (e.g., a display, etc.).

The voice input unit 110 receives a user's spoken command through a voice input apparatus such as a microphone, and performs signal-processing so that a voice or spoken command can be recognized. Specifically, the voice input unit 110 receives a user's spoken command in an analogue form, converts the user's spoken command into a digital signal, and removes noise from the digital signal.

The display unit 130 outputs various video data under control of the controller 120. In particular, if a user command to correct text is input, the display unit 130 displays a text correction UI.

If a user's spoken command is input through the voice input unit 110, the controller 120 recognizes the user's spoken command and determines a text corresponding to the user's spoken command. If a user command to correct the determined text is input, the controller 120 displays a text correction UI in which morphemes constituting the text and indicators are matched with each other. At this time, the text correction UI divides the text information uttered by the user into morphemes, assigns an indicator to each morpheme, and displays the morphemes and the indicators matched with each other. The indicator is to discriminate the morphemes of the text information and may be a number or a character.

The controller 120 controls the display unit 130 to correct at least one morpheme of the determined text by selecting the indicator of the text correction UI. Specifically, if a target morpheme to be replaced is selected using the indicator of the text correction UI, the controller 120 may display a candidate morpheme of the target morpheme to be replaced. If one of the candidate morphemes is selected, the controller 120 may control the display unit 130 to correct the target morpheme by replacing it with the selected candidate morpheme.

At this time, the controller 120 may control the display unit 130 to display an indicator corresponding to the candidate morpheme on one side of the candidate morpheme. If one of the indicators of the candidate morphemes is selected, the controller 120 may control the display unit 130 to correct the target morpheme by replacing it with the candidate morpheme corresponding to the selected indicator.

The controller 120 may control the display unit 130 to display text information reflecting a result of the correcting. Also, the controller 120 may update a sound model and a language model stored in an internal or external server to update the result of the correcting.

As described above, the broadcast receiving apparatus 100 corrects the misrecognized text by selecting the indicator of the text correction UI so that the user can exactly correct the word misrecognized by the broadcast receiving apparatus 100 with a desired word.

Figure 3:
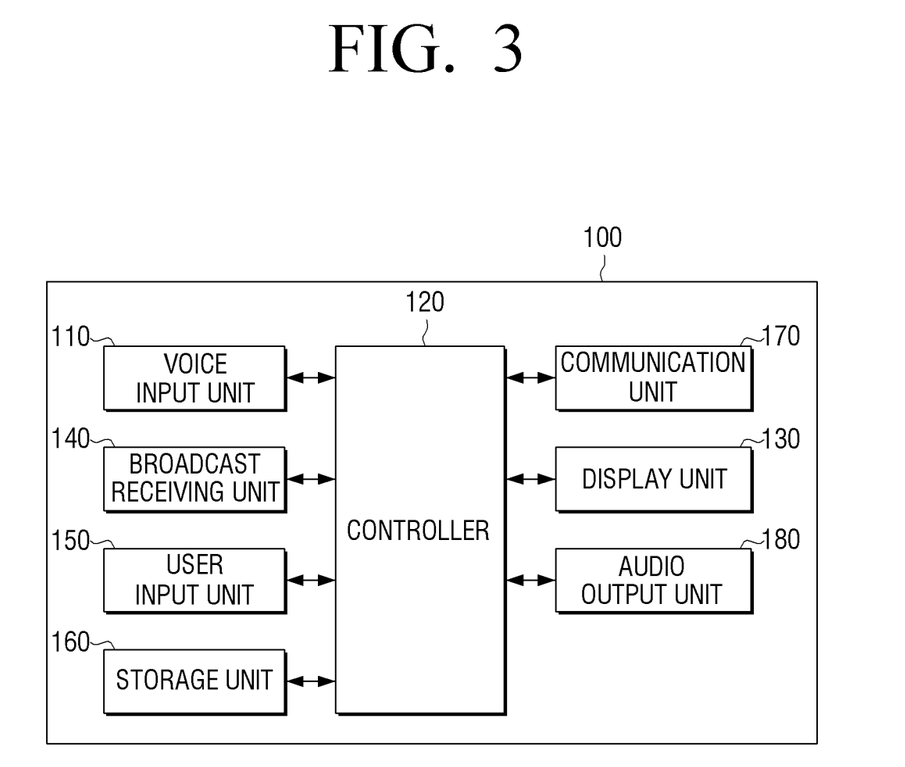
FIG. 3 is a block diagram illustrating a broadcast receiving apparatus in detail according to an exemplary embodiment.

FIG. 3 is a block diagram illustrating the broadcast receiving apparatus 100 in detail according to an exemplary embodiment. As shown in FIG. 3, the broadcast receiving apparatus 100 includes a voice input unit 110, a controller 120, a display unit 130, a broadcast receiving unit 140 (e.g., a broadcast receiver, etc.), a user input unit 150 (e.g., a user input, etc.), a storage unit 160 (e.g., a storage, etc.), a communication unit 170 (e.g., a communicator, etc.), and an audio output unit 180 (e.g., an audio output, etc.).

The voice input unit 110 receives a user's spoken command and signal-processes the user's spoken command so that the user's spoken command can be recognized. Specifically, the voice input unit 110 converts the user's spoken command of an analogue form into a digital signal. The voice input unit 110 calculates energy of the converted digital signal and determines whether the energy of the digital signal is greater than or equal to a predetermined value. If the energy of the digital signal is less than the predetermined value, the voice input unit 110 determines that the input digital signal is not a user's spoken command and awaits another user's spoken command. If the energy of the digital signal is greater than or equal to the predetermined value, the voice input unit 110 removes a noise from the input digital signal. In particular, the voice input unit 110 removes an unexpected noise (for example, a sound of an air conditioner, a sound of a vacuum cleaner, and a music sound) which is generated in general households from the digital signal. The voice input unit 110 outputs the digital signal from which the noise is removed to the communication unit 170.

The voice input unit 110 may be realized by a voice input apparatus such as a microphone, and the voice input apparatus may be embedded in the broadcast receiving apparatus 100 as an all-in-one type device or may be realized as a standalone type device separately from the broadcast receiving apparatus 100. If the voice input unit 110 is realized as a standalone type, the voice input apparatus may be realized in a form of being grasped by user's hand or in a form of being placed on a table, and may be connected to the broadcast receiving apparatus 100 in a wired or wireless manner.

The broadcast receiving unit 140 receives a broadcast signal including a plurality of channels from an external base station or an external apparatus (for example, a set-top box). The broadcast receiving unit 140 tunes to a broadcast signal of a channel which is selected by the user and signal-processes the broadcast signal.

The user input unit 150 receives a user command to control the broadcast receiving apparatus 100. The user input unit 150 may be realized by various input apparatuses such as a remote controller, a mouse, and a keyboard.

The storage unit 160 stores various programs and data for driving the broadcast receiving apparatus 100. In particular, the storage unit 160 may store a language model, a sound model, and a pronunciation dictionary for recognizing a voice or spoken command.

The communication unit 170 communicates with the external servers 200 and 300. In particular, the communication unit 170 may transmit a digital signal corresponding to a user's spoken command received from the voice input unit 110 to the first server 200, and may receive text information corresponding to the user's spoken command from the first server 200. Also, the communication unit 170 may transmit the text information corresponding to the user's spoken command to the second server 300 and may receive response information corresponding to the text information from the second server 300. The response information may include a response message, a control signal, and content data of content which is requested to be searched by the user.

The communication unit 150 may be implemented using by a wireless communication module which is connected to an external network according to a wireless communication protocol such as Wi-Fi and IEEE. Besides these, the wireless communication module may further include a mobile communication module which accesses a mobile network and communicates with it according to various mobile communication standards such as $3^{rd}$ Generation (3G), $3^{rd}$ Generation Partnership Project (3GPP), and long term evolution (LTE).

In the above exemplary embodiment, an integrated communication unit communicates with the first server 200 and the second server 300. However, this is merely an example and the communication unit may be divided into a first communication unit to communicate with the first server 200 and a second communication unit to communicate with the second server 300.

Figure 4:
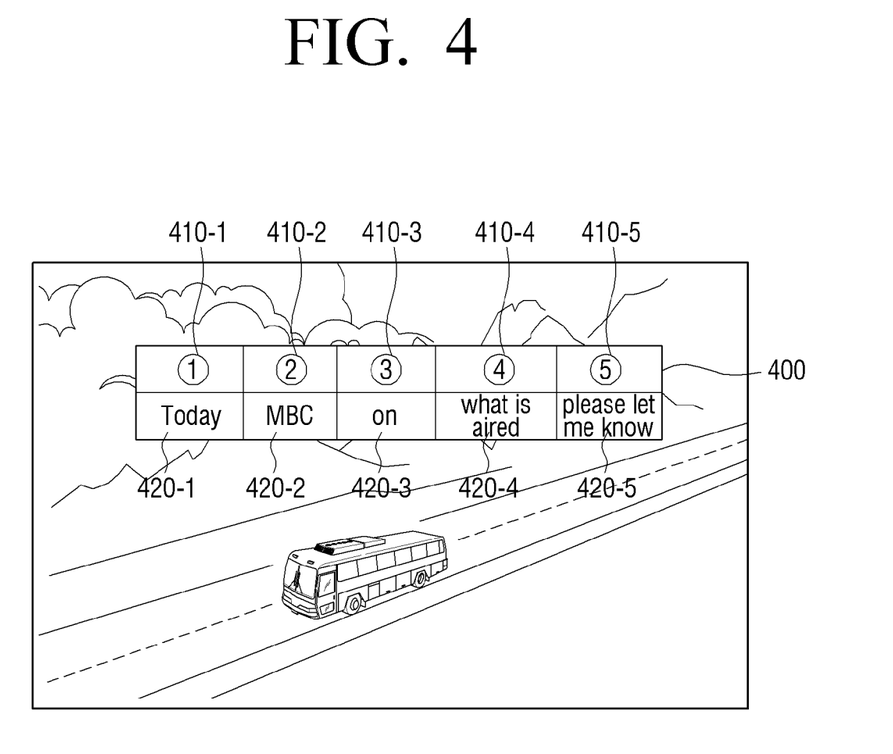
FIGS. 4 to 6 are views illustrating a process of correcting a misrecognized word using a text correction user interface (UI) according to an exemplary embodiment.

The display unit 130 displays video data under control of the controller 120. In particular, if a user command to correct a text is input, the display unit 130 displays a text correction UI as shown in FIG. 4. The text correction UI 400 will be explained in detail below.

The display unit 130 may be implemented using a liquid crystal display (LCD), an organic light emitting diode (OLED) display, or a plasma display panel (PDP).

The audio output unit 180 outputs audio data. The audio output unit 180 may output audio data which is converted from content data. At this time, the audio output unit 180 may be implemented by an output port such as a speaker or a jack.

The controller 180 controls an overall operation of the broadcast receiving apparatus 100 according to a user command input through the voice input unit 110 and the user input unit 150.

In particular, if a user's spoken command is input through the voice input unit 110, the controller 120 performs voice recognition. Specifically, the controller 120 controls the voice input unit 110 to convert the user's spoken command of an analogue form input through the voice input unit 110 into a digital signal, and to remove a noise from the digital signal. The controller 120 transmits the digital signal corresponding to the user's spoken command to the first external server 200 through the communication unit 170. If the first server 200 converts the digital signal corresponding to the user's spoken command into text information using the sound model, the language model and the pronunciation dictionary, and transmits the text information to the broadcast receiving apparatus 100, the controller 120 receives the text information through the communication unit 170.

The controller 120 may display the received text information on the display unit 130, or may transmit the text information to the second external server 300.

As described above, the broadcast receiving apparatus 100 uses the first external server 200 to determine the text corresponding to the user's spoken command. However, this is merely an example and the broadcast receiving apparatus 100 may determine the text corresponding to the user's spoken command using a sound model, a language model and a pronunciation dictionary included therein.

If the text corresponding to the user's spoken command is determined, the user identifies the text information displayed on the display unit 130 so that the user can identify whether the text uttered by the user is correctly recognized or not. Also, the user identifies the response information received from the second server 200, so that the user can identify whether the text uttered by the user is correctly recognized or not. For example, if the voice or spoken command uttered by the user is "Please let me know what is aired today on MBN", but the controller 120 determines that the text information corresponding to the user's spoken command is "Please let me know what is aired today on MBC" and displays the text information on the display unit 130, the user identifies that the broadcast receiving apparatus 100 misrecognizes the user's spoken command.

If the user's uttered voice or spoken command is misrecognized and a user command to correct the text (for example, a specific button on a remote controller or a user's voice command) is input by the user, the controller 120 controls the display unit 130 to display the text correction UI 400 to correct the text recognized by the broadcast receiving apparatus 100, as shown in FIG. 4.

The text correction UI 400 divides the text information into a plurality of morphemes, assigns an indicator (for example, a number, a character, symbol, etc.) to each of the morphemes, and matches the morphemes and the indicators with each other. For example, if the recognized text information is "Please let me know what is aired today on MBC", the text correction UI 400 divides the text information into morphemes, "today" 420-1, "MBC" 420-2, "on" 420-3, "what is aired" 420-4, and "Please let me know" 420-5, and displays the morphemes. The text correction UI 400 matches "today" 420-1 with "1" 410-1, matches "MBC" 420-2 with "2" 410-2, matches "on" 420-3 with "3" 410-3, matches "what is aired" 420-4 with "4" 410-4, and matches "Please let me know" 420-5 with "5" 410-5.

If a user's spoken command includes one of the indicators included in the text correction UI 400, the controller 120 may select the morpheme corresponding to the selected indicator as a target morpheme to be replaced. For example, if the user's spoken command includes the indicator "2" 410-2, the controller 120 may select the morpheme "MBC" 420-2 corresponding to the indicator "2" 410-2 as a target morpheme to be replaced.

If the user's spoken command includes a morpheme to correct the target morpheme as well as the indicator, the controller 120 may correct the target morpheme by replacing it with the correct morpheme. For example, if a user's spoken command "Please change the number 2 to MBN" is input through the voice input unit 110, the controller 120 transmits a digital signal corresponding to the user's spoken command to the first server 200 and the first server 200 determines text information corresponding to the input user's spoken command. The first sever 200 transmits the text information to the second server 300 through the broadcast receiving apparatus 100. The second server 300 determines a target morpheme to be replaced based on "2" of the inputted user's spoken command, determines correct morpheme based on "MBN", and determines a correcting command based on "Please change". The second server 300 transmits a control signal "Please change the target morpheme to be replaced, "MBC", to the correct morpheme, "MBN" to the broadcast receiving apparatus 100. If the control signal is received through the communication unit 170, the controller 120 corrects the target morpheme to be replaced, "MBC" 420-2, by replacing it with the correct morpheme, "MBN".

Figure 5:
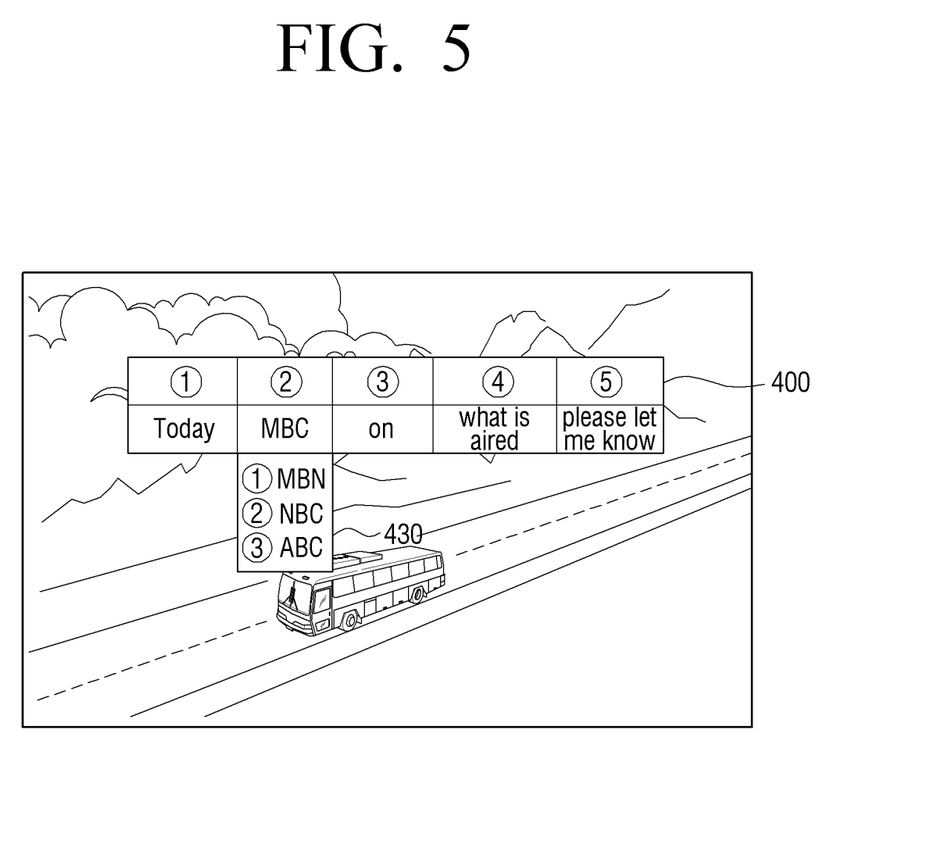
Figure 6:
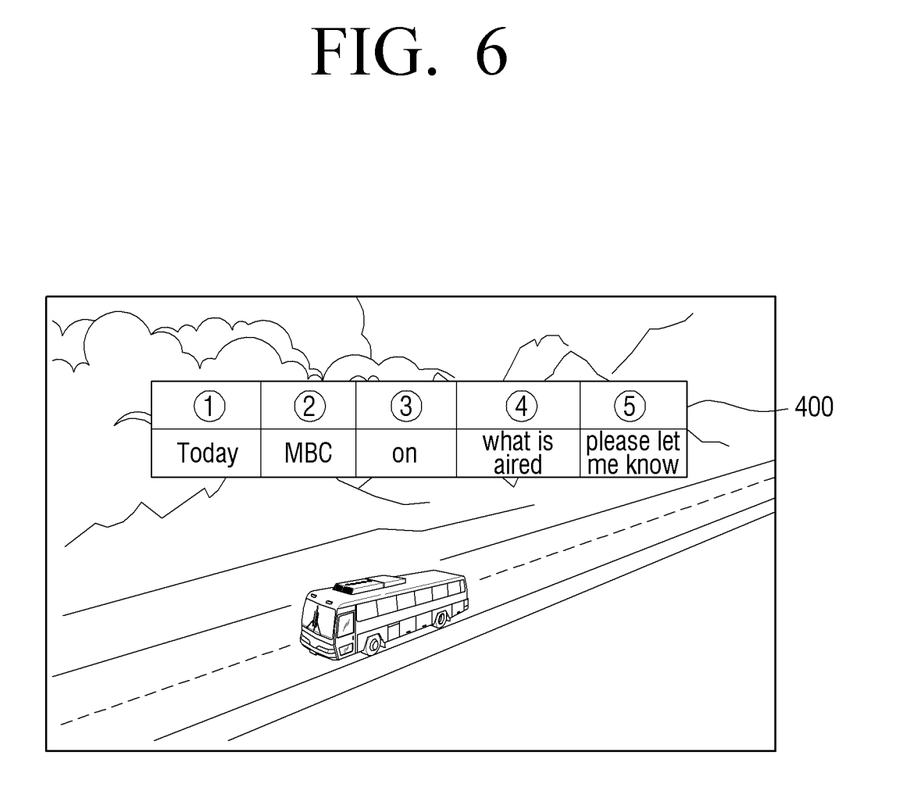

According to another exemplary embodiment, if the user's spoken command includes one of the indicators included in the text correction UI 400, the controller 120 may control the display unit 130 to display a candidate morpheme of the target morpheme to be replaced. The candidate morpheme of the target morpheme to be replaced may be determined based on the sound model, the language model, and the pronunciation dictionary, which are stored in the broadcast receiving apparatus 100 or the first server 200, and may be a morpheme having the highest probability of being consistent with the user's spoken command, except for the target morpheme. For example, if "number 2" is included in the user's spoken command, the controller 120 may display candidate morphemes 430 as shown in FIG. 5 and FIG. 6. The candidate morphemes may be "MBN", "NBC", and "ABC".

Each of the candidate morphemes may be assigned an indicator as shown in FIG. 5. For example, "MBN" may be assigned indicator "1", "NBC" may be assigned indicator "2", and "ABC" may be assigned indicator "3".

If one of the indicators corresponding to the candidate morphemes is selected while the candidate morphemes are displayed, the controller 120 may replace the target morpheme with the candidate morpheme corresponding to the selected indicator. For example, if a user's spoken command "Please change to number 1" is input through the voice input unit 110, the broadcast receiving apparatus 100 transmits a digital signal corresponding to the user's spoken command to the first server 200, and the first server 200 determines text information corresponding to the input user's spoken command. The first server 200 transmits the text information to the second server 300 through the broadcast receiving apparatus 100. The second server 300 may determine the correct morpheme based on "1" of the input user's spoken command and may determine a correcting command based on "please change". The second server 300 may transmit a control signal "please change the target morpheme to be replaced, "MBC", to the correct morpheme, "MBN" to the broadcast receiving apparatus 100. If the control signal is received through the communication unit 170, the controller 120 may correct the target morpheme, "MBC" 420-2 by replacing it with the correct morpheme, "MBN".

If the target morpheme is corrected by being replaced with the correct morpheme, the controller 120 may transmit a result of the correcting to the first server 200 to update the language model and the sound model stored in the first server 200. For example, if the initially recognized "MBC" is replaced with "MBN", the controller 120 may transmit the result of the correcting to the first server 200 to update the language model and the sound model, and to increase the probability that the digital signal of the user's uttered voice or spoken command is consistent with the text "MBN". Accordingly, if the user utters "MBN" afterward, the probability that the broadcast receiving apparatus 100 recognizes "MBN" rather than "MBC" increases and thus it is possible to recognize the voice or spoken command more precisely.

As described above, the user can correct the misrecognized voice commands more easily using the broadcast receiving apparatus 100.

Figure 7:
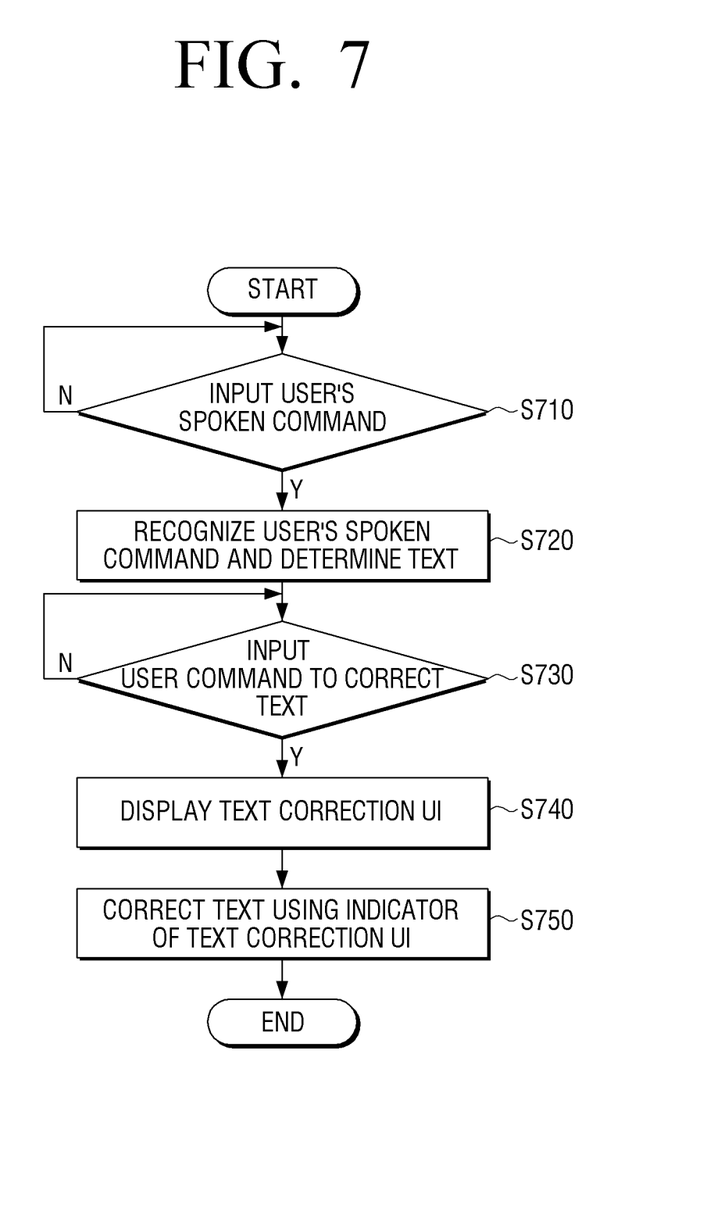
FIG. 7 is a flowchart illustrating a method for correcting a voice recognition error according to an exemplary embodiment.

Hereinafter, a method for correcting a voice recognition error will be explained in detail with reference to FIG. 7.

First, the broadcast receiving apparatus 100 receives a user's spoken command (S710). The broadcast receiving apparatus 100 may receive the user's spoken command using a voice input apparatus such as a microphone.

The broadcast receiving apparatus 100 recognizes the user's spoken command and determines a text corresponding to the user's spoken command (S720). Specifically, the broadcast receiving apparatus 100 may convert the input user's spoken command into a digital signal and may transmit the digital signal to the first external server 200. The first server 200 determines text information corresponding to the digital signal using a sound model, a language model, and a pronunciation dictionary, and transmits the text information to the broadcast receiving apparatus 100. Then, the broadcast receiving apparatus 100 determines a text corresponding to the user's spoken command.

The broadcast receiving apparatus 100 determines whether a user command to correct the text is input or not (S730).

If the user command to correct the text is input (S730-Y), the broadcast receiving apparatus 100 displays a text correction UI (S740). At this time, the text correction UI divides the text into morphemes, assigns indicators (for example, a number or a character) to the morphemes, and displays the morphemes and the indicators matched with each other.

The broadcast receiving apparatus 100 corrects the text by selecting the indicator of the text correction UI (S750). Specifically, if a target morpheme to be replaced is selected using an indicator of the text correction UI, the broadcast receiving apparatus 100 may display candidate morphemes of the target morpheme as shown in FIG. 5. If one of the candidate morphemes is selected, the broadcast receiving apparatus 100 may correct the target morpheme by replacing it with the selected candidate morpheme. At this time, the broadcast receiving apparatus 100 may display an indicator corresponding to the candidate morpheme on one side of the candidate morpheme. After that, if one of the indicators of the candidate morphemes is selected, the broadcast receiving apparatus 100 may correct the target morpheme by replacing it with the candidate morpheme corresponding to the selected indicator.

The broadcast receiving apparatus 100 displays text information reflecting a result of the correcting, and transmits the result of the correcting to the first server 200 to update the sound model and the language model stored in the first server 200.

As described above, the misrecognized text is corrected using the indicator, so that the user can prevent misrecognition from re-occurring when the voice recognition error is corrected.

A program code for performing the method for correcting the voice recognition error according to various exemplary embodiments described above may be stored in a non-transitory computer readable medium. The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a CD, a DVD, a hard disk, a Blu-ray disk, a USB, a memory card, and a ROM, and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for correcting a voice recognition error of a broadcast receiving apparatus, the method comprising:
   receiving a user's spoken command;
   recognizing the user's spoken command; and
   determining text corresponding to the user's spoken command;
   if a user command to correct the determined text is input, displaying a text correction user interface (UI) which comprises a morpheme of the determined text and an indicator corresponding to the morpheme of the determined text; and
   correcting the morpheme corresponding to the indicator selected by a user voice comprising the indicator.

2. The method as claimed in claim 1, wherein the morpheme is an initial morpheme and the correcting comprises:
   if the initial morpheme is selected using the associated indicator, displaying a candidate morpheme corresponding to the initial morpheme; and
   if the candidate morpheme is selected, correcting the initial morpheme by replacing the initial morpheme with the selected candidate morpheme.

3. The method as claimed in claim 2, wherein the displaying the candidate morpheme comprises displaying a second indicator corresponding to the candidate morpheme on one side of the candidate morpheme.

4. The method as claimed in claim 3, wherein the correcting the target morpheme comprises, if the second indicator corresponding to the candidate morpheme is selected, correcting the initial morpheme to be replaced by replacing the initial morpheme with the candidate morpheme corresponding to the selected indicator.

5. The method as claimed in claim 1, wherein the indicator comprises one from among a number and a character.

6. The method as claimed in claim 1, wherein the determining comprises: converting the user's spoken command from an analogue signal format into a digital signal format;
   transmitting the user's spoken command in the digital signal format to an external server; and
   receiving text information corresponding to the user's spoken command in the digital signal format from the server.

7. The method as claimed in claim 6, further comprising transmitting a result of the correcting to the server to update a language model and a sound model stored in the server.

8. A broadcast receiving apparatus comprising:
   a voice input which receives a user's spoken command; and
   a controller which, if a user's spoken command is input through the voice input, recognizes the user's spoken command and determines text corresponding to the user's spoken command, if a second user command to correct the determined text is input, displays a text correction user interface (UI) which comprises a morpheme of the determined text and an indicator corresponding to the morpheme of the determined text, and controls a display to correct the morpheme corresponding to the indicator selected by a user voice comprising the indicator.

9. The broadcast receiving apparatus as claimed in claim 8, wherein the morpheme is an initial morpheme, if the initial morpheme is selected using the associated indicator, the controller displays a candidate morpheme corresponding to the initial morpheme, and, if the candidate morpheme is selected, the controller controls the display to correct the initial morpheme by replacing the initial morpheme with the selected candidate morpheme.

10. The broadcast receiving apparatus as claimed in claim 9, wherein the controller controls the display to display a second indicator corresponding to the candidate morpheme on one side of the candidate morpheme.

11. The broadcast receiving apparatus as claimed in claim 10, wherein, if the second indicator corresponding to the candidate morpheme is selected, the controller controls the display to correct the initial morpheme to be replaced by replacing the initial morpheme the candidate morpheme corresponding to the selected indicator.

12. The broadcast receiving apparatus as claimed in claim 8, wherein the indicator comprises one from among a number and a character.

13. The broadcast receiving apparatus as claimed in claim 8, further comprising a communicator which communicates with an external server,
   wherein, if a user's spoken command is input through the voice input, the controller converts the user's spoken command from an analogue signal format into a digital signal format, transmits the user's spoken command in the digital signal format to the external server through the communicator, receives text information corresponding to the user's spoken command in the digital signal format from the server, and determines the text information.

14. The broadcast receiving apparatus as claimed in claim 13, wherein the controller controls the communicator to transmit a result of the correcting to the server to update a language model and a sound model stored in the server.

15. A method for correcting a voice recognition error of a broadcast receiving apparatus, the method comprising:
   recognizing a user's spoken command;
   determining text corresponding to the user's spoken command;
   displaying an indicator which comprises a morpheme of the determined text; and
   correcting the morpheme corresponding to the indicator selected by a user voice comprising the indicator.

16. The method as claimed in claim 15, wherein the correcting comprises:

displaying a candidate morpheme corresponding to the morpheme of the determined text in response to receiving the user voice corresponding to the indicator; and selecting the candidate morpheme and correcting the morpheme of the determined text by replacing the morpheme of the determined text with the selected candidate morpheme.

17. The method as claimed in claim 16, further comprising transmitting a result of the correcting to a server to update a language model and a sound model stored in the server.

* * * * *